US007638077B2

(12) United States Patent
Gaskarth

(10) Patent No.: US 7,638,077 B2
(45) Date of Patent: Dec. 29, 2009

(54) DRAINAGE/IRRIGATION ELEMENTS FROM RECYCLED PLASTICS

(75) Inventor: John Gaskarth, Whitby (GB)

(73) Assignee: Econoplas Limited, Scarborough (GB)

( * ) Notice: Subject to any disclaimer, the term of this patent is extended or adjusted under 35 U.S.C. 154(b) by 611 days.

(21) Appl. No.: 10/548,917

(22) PCT Filed: Mar. 16, 2004

(86) PCT No.: PCT/GB2004/001107

§ 371 (c)(1),
(2), (4) Date: Sep. 14, 2005

(87) PCT Pub. No.: WO2004/082912

PCT Pub. Date: Sep. 30, 2004

(65) Prior Publication Data

US 2006/0208376 A1 Sep. 21, 2006

(30) Foreign Application Priority Data

Mar. 19, 2003 (GB) ................................ 0306284.1

(51) Int. Cl.
*B29C 65/00* (2006.01)

(52) U.S. Cl. .................. 264/37.1; 264/37.3; 264/37.32; 264/140; 264/142; 264/152

(58) Field of Classification Search ................. 264/117, 264/125, 140–144, 152; 62/529
See application file for complete search history.

(56) References Cited

U.S. PATENT DOCUMENTS 2,119,768 A * 6/1938 Anthony ..................... 241/296
2,761,177 A * 9/1956 Ben Walters ................ 156/279
2,948,918 A * 8/1960 Austin ......................... 23/314
4,003,408 A 1/1977 Turner
5,258,085 A 11/1993 Breitscheidel
5,588,599 A 12/1996 Novak (Continued)

FOREIGN PATENT DOCUMENTS

DE 1454875 2/1969

(Continued)

*Primary Examiner*—Christina Johnson
*Assistant Examiner*—Magali P Théodore
(74) *Attorney, Agent, or Firm*—Keeling Patents & Trademarks, LLC; Kenneth A. Keeling; Melissa M. Martinez

(57) ABSTRACT

A method of making drainage elements from recycled thermoplastic plastics materials comprising the steps of: providing chopped waste plastics to a screw extruder having a screw. In the extruder, the waste is compressed and delivered to a twin-plate agglomerator. One plate is closely adjacent to, and rotates with respect to, the other plate. Between the plates the waste plastics is agglomerated and the mechanical energy imparted by the extruder screw and plates heats the plastics material to about the melting point of the thermoplastic material. Hot noodles of melted plastics material extrudes from an outlet of the plates. The noodles are conveyed to a chute of a compactor funnel which has an outlet disposed closely above an output conveyor belt. The belt conveys, from the outlet of the compactor funnel, a compacted ribbon of the material at a rate such that the noodles in the funnel have a head to compact the noodles in the funnel sufficiently to bind the noodles together but not without leaving multiple spaces between them. The ribbon is cooled and chopped into bats.

18 Claims, 3 Drawing Sheets

U.S. PATENT DOCUMENTS

| | | | | | |
|---|---|---|---|---|---|
| 5,660,209 | A * | 8/1997 | Franz et al. | 138/103 |
| 5,931,005 | A * | 8/1999 | Garrett et al. | 62/86 |
| 5,976,432 | A * | 11/1999 | Yang et al. | 264/40.3 |
| 6,238,733 | B1 | 5/2001 | Therolf | |
| 2003/0227101 | A1* | 12/2003 | Christoffersen | 264/40.1 |

FOREIGN PATENT DOCUMENTS

| | | | |
|---|---|---|---|
| DE | 42 17 739 | A1 | 2/1993 |
| DE | 296 16 068 | U1 | 9/1996 |
| DE | 202 19 596 | U1 | 12/2002 |
| EP | 0004093 | | 9/1979 |
| EP | 0312938 | | 4/1989 |
| EP | 0 629 746 | A3 | 12/1994 |
| EP | 1 201 391 | A1 | 5/2002 |
| FR | 2 706 792 | A1 | 12/1994 |
| FR | 2 815 561 | | 4/2002 |
| JP | 11058381 | | 3/1999 |
| WO | PCT/AT99/00099 | | 11/1999 |
| WO | WO 00/73593 | A1 | 7/2000 |

* cited by examiner

DRAINAGE/IRRIGATION ELEMENTS FROM RECYCLED PLASTICS

CROSS-REFERENCE TO RELATED APPLICATIONS

None.

STATEMENT REGARDING FEDERALLY SPONSORED RESEARCH OR DEVELOPMENT

None.

BACKGROUND OF THE INVENTION

This invention relates to a method of making drainage/irrigation elements from recycled plastics material. The invention also provides a drainage/irrigation element comprising a bat of recycled thermoplastics material in the form of noodles of agglomerated said material melded together in an open, porous structure.

Various methods of making drainage/irrigation elements from recycled plastics material are known, as are such products.

DE-A-4217739 discloses a drainage soakaway mat made from recycled plastics material. Plastics material is chopped into strips or threads using environmentally friendly and energy saving preparation methods, although what those methods are is not specified. The material is then cleaned and then shaped into a drainage soakaway mat when hot. Again, there is no explanation, in fact, as to how this is to be achieved. After the drainage soakaway mat has cooled down, the strips or threads weld together so that an elastic and solid slab with many hollow spaces, which are the actual drainage organs, forms. As far as the present applicant is aware, no such material as described has been supplied to the market.

FR-A-2706792 discloses a method of granulating recycled plastics by compressing waste plastics in an archimedes screw extruder and pressing through apertures in a die provided with a face cutter that cuts the out put into granules. The only heat of the process is provided by mechanical action imparted on the plastics material, but this is enough to melt and agglomerate the plastics into relatively homogenous plastics pellets. EP-A-1201391 and WO-A-9956925 also describe agglomeration of waste material.

WO-A-0073593 describes a drainage/irrigation element comprising a mixture of thermoplastic, thermoset and fibrous materials melded together by the thermoplastic materials.

It is an object of the present invention to provide a method of making drainage elements from recycled plastics which is both efficient and flexible.

BRIEF SUMMARY OF THE INVENTION

In accordance with the present invention there is provided a method of making drainage elements from recycled plastics comprising the steps of:

a) providing chopped waste thermoplastic plastics to an agglomerator;

b) agglomerating the waste plastics and wherein the mechanical energy imparted by the agglomerator heats the plastics material to about the melting point of a proportion of said thermoplastic plastics material so that malleable noodles of softened plastics material extrudes from an outlet of said agglomerator;

c) conveying said noodles to a chute of a compactor/shaper funnel having an outlet disposed closely above an output conveyor belt;

d) arranging the belt to convey from the outlet of the compactor/shaper funnel a compacted ribbon of said agglomerated plastics material at a rate such that the noodles in the funnel have a head to compact said noodles in the outlet sufficient to meld the noodles together but not without leaving multiple spaces between them; and e) cooling the ribbon and chopping it into bats.

DETAILED DESCRIPTION OF THE INVENTION

Figure 3:
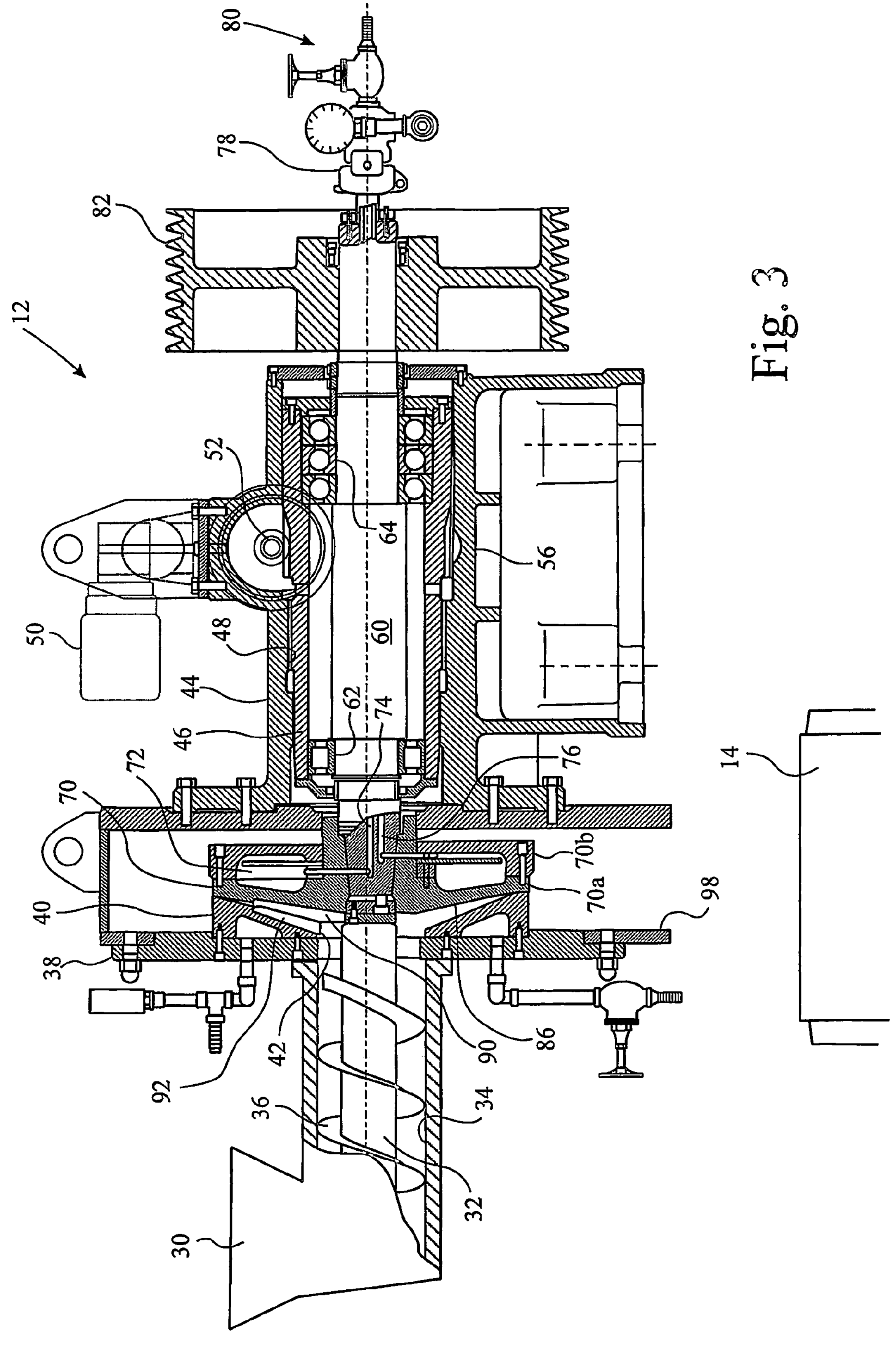
FIG. 3 is a side section through a screw extruder and agglomerator employed in the apparatus of FIG. 1.
Figure 4:
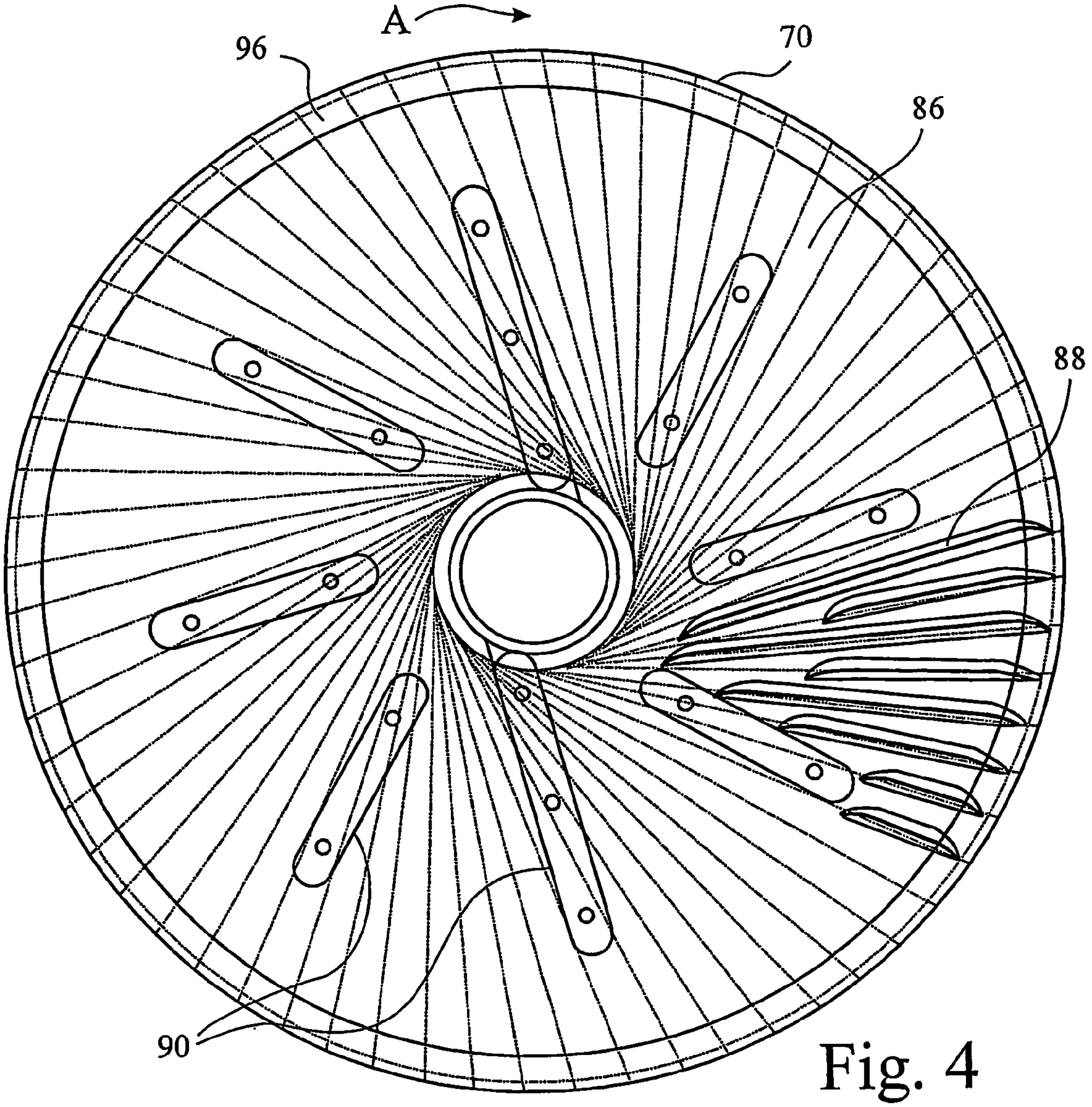
FIG. 4 is a front view of one plate of the agglomerator of FIG. 3.

With reference to FIGS. 3 and 4, in the first step of the present invention chopped waste thermoplastic plastics is provided to an agglomerator 12. Preferably, the agglomerator 12 includes a screw extruder having a screw 32. Preferably, said agglomerator 12 is a twin-plate agglomerator in which one plate 40 is closely adjacent to, and rotates with respect to, the other plate 70, one plate being provided with ridges 90 extending substantially radially from the axis of rotation of the rotating plate 70, and one or both plates being provided with grooves 88 also extending substantially radially from the axis of rotation of the rotating plate. Preferably, the twin-plate agglomerator 12 has one plate 70 fixed on the end of a shaft 60 which is rotationally journalled in a housing, the shaft 60 being axially adjustable in the housing 38, said other plate being fixed in the housing 38. Preferably, said other plate 40 has a central aperture through which said screw 32 extends, a coupling being provided between said shaft 60 and screw 32 to drive the shaft 60.

In the second step of the present invention the waste plastics are agglomerated. The mechanical energy imparted by the agglomerator heats the plastics material to about the melting point of a proportion of said thermoplastic plastics material so that malleable noodles 16 of softened plastics material extrudes from an outlet 98 of said agglomerator. Preferably the second step comprises agglomerating said waste between the twin plates of the agglomerator. Preferably, the gap between said plates 70 and 40 is adjustable, whereby the temperature of the noodles 16 exiting the agglomerator 12 can be adjusted. Preferably in the extruder of the agglomerator, the waste is compressed with the screw 32 and delivered to the inlet of the agglomerator chamber between plates 70 and 40. Preferably, there is no further addition of heat beyond that generated by said mechanical energy.

Figures 1, 2:
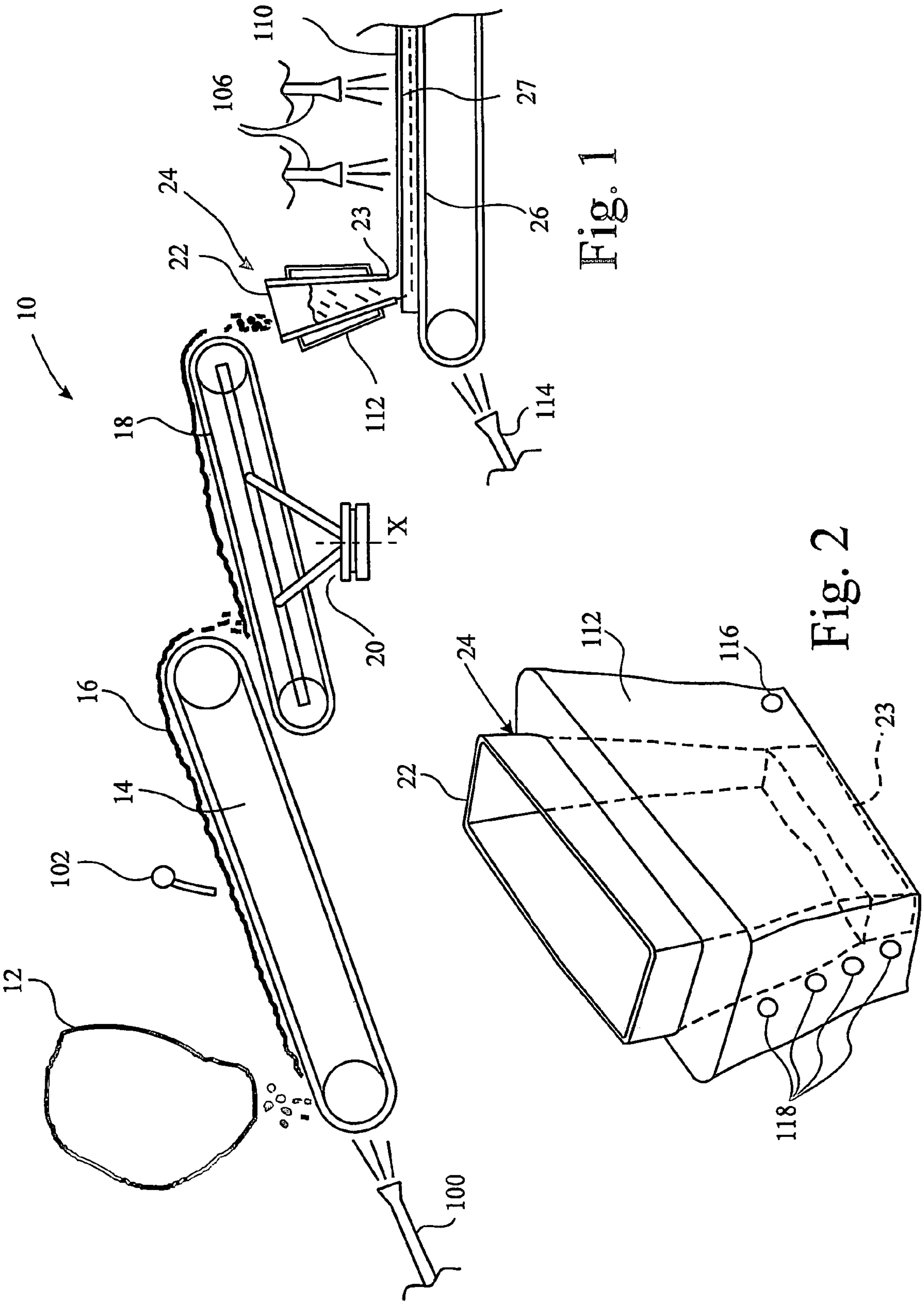
FIG. 1 is schematic illustration of apparatus suitable for putting the invention into effect.
FIG. 2 is perspective view of a funnel compactor/shaper employed in the apparatus of FIG. 1.

Referring now to FIGS. 1 and 2, in the third step of the present invention the noodles 16 are conveyed to a chute 22 of a compactor/shaper funnel 24 having an outlet 23 disposed closely above an output conveyor belt 26. Preferably, during such conveyance the noodles 16 are cooled so that their surface is substantially petrified and non-sticky but internally they are still soft. Preferably such cooling is accomplished by conveying the noodles from the agglomerator 12 on an intermediate conveyor belt 18 and spraying the belt 18 before said noodles 16 drop onto it from the agglomerator 12 with cooling water. Such spraying has the dual effect of partially cooling the noodles 18 when they fall onto the intermediate belt 18 and cooling the belt 18 itself so that the noodles 16 do not stick to it. Preferably, conveying said noodles 16 to the chute 22 of said compactor/shaper funnel 24 comprises the further step of delivering the noodles to said chute evenly across its mouth so that there is a substantially level surface of noodles 16 in the funnel 24 and therefore an even compression of the noodles 16 beneath. Preferably, said even delivery is achieved by arranging for the intermediate conveyor 18 to oscillate across the width of the mouth of the chute 22. Indeed, the intermediate conveyor 18 may deliver to a separate oscillating conveyor that provides the final delivery to the chute. Preferably, conveying said noodles 16 to the chute further comprises the step of sprinkling chips selected from the group comprising fibre, rubber, vermiculite, solid thermoplastics and charcoal onto the noodles on said intermediate conveyor 18 to form inclusions in the finished bats. Such inclusions improve the retention of water by the bats and so render the drainage bats also more suitable for irrigation purposes during dry periods. Preferably, a blowing agent is added prior to agglomeration to reduce the density of the noodles and render them porous so that water retention is further enhanced.

In the fourth step of the present invention, the belt 26 is arranged to convey from the outlet 23 of the compactor/shaper funnel 24 a compacted ribbon 110 of said agglomerated plastics material at a rate such that the noodles 16 in the funnel 24 have a head to compact said noodles 16 in the outlet 23 sufficient to meld the noodles 16 together but not without leaving multiple spaces between them. Preferably the compactor funnel 24 is provided with a cooling jacket 112. Preferably the cooling jacket 112 has adjustable levels of cooling, whereby the noodles 16 in the compactor 24 are cooled and the degree of cooling is adjustable. Said jacket 112 may comprise a water jacket 112 having an inlet 116 at the base of the funnel 24 at the level of its outlet 23, and several outlets 118 at different levels above the inlet 116. Either, the outlets 118 may be selectively blocked, or the rate of flow of cooling water into the jacket 112 may be adjusted, or both, so that the level of water in the jacket 112, and/or its temperature, may be controlled.

Figure 5:
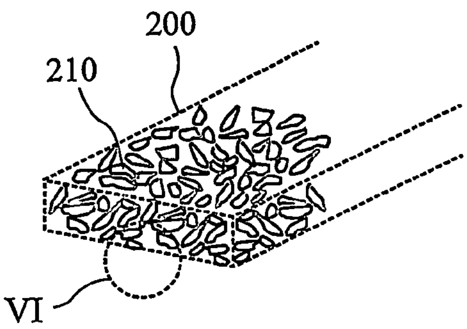
FIG. 5 is a perspective view of a bat of a drainage/irrigation element in accordance with the present invention.

In the fifth step of the present invention, the ribbon 110 is cooled and thereafter chopped into bats 200 (see FIG. 5). Provided that during the third step the noodles 16 are cooled so that their surface is substantially petrified and non-sticky but internally they are still soft, the compacting in the fifth step can be controlled more easily to achieve the desired aim of melding together individual noodles 16 that are pressed closely together, without the noodles 16 sticking to the surfaces of the apparatus. The final product is a one-piece, integral component having sufficient strength to remain intact on subsequent handling, but without excluding most of the spaces between the noodles 16. The bats 200 so-formed have an open matrix of spaces through which water and other liquids and gases can flow with relative freedom, making them ideal drainage medium elements for underground irrigation and drainage purposes.

Being able to adjust the temperature of the process at different stages is desirable when using waste plastics in this process. If a single homogenous plastics material was employed, such adjustments would not be required once satisfactory conditions had been established. Even waste plastics material at any given time tends to be amorphous, particularly when it has been extensively chopped and mixed and has come from a single, relatively consistent source (for example, the waste of a plastics fabricator). Nevertheless, it is a feature of the present invention that elements of the waste can pass through the process relatively unscathed, but generally all individual elements will be bound up within the final bat, only perhaps some being able to fall from the bat subsequently. However, elements of the waste plastics being unmelted is not a disadvantage, because they also serve to keep the interstitial spaces between noodles open, and so improve the final performance of the drainage bat. But the ability to adjust the temperature at different parts of the process becomes most important when waste plastics from different sources are employed, where the majority constituents of the feedstock to the process may change. At these times, the temperature of the output from the agglomerator 12 may drop if the material has no shear strength and does not generate heat when compressed and agglomerated. So bringing the agglomeration plates 40 and 70 together can increase that temperature. Likewise, some products may require a higher temperature to melt. Others are more liquid (less viscous) when they melt, so that more immediate cooling on the intermediate conveyor is needed to prevent the noodles immediately coalescing into solid lumps, as well as sticking to the intermediate conveyor. Some products may have relatively high heat conductivity, so that they tend to re-melt more quickly and may coalesce in the funnel if more cooling is not provided there.

By providing different adjustments at each stage, the process can accommodate waste plastics material from different sources that may have different constituents. Preferably, the element has inclusions of chips of matter selected from the group comprising charcoal, unagglomerated thermoplastics, rubber, vermiculite and fibre. Rubber in this context includes any elastomeric material, natural or otherwise, and includes vehicle tyre fragments. Fibre includes carpet fragments.

Apparatus 10, which is employed in the manufacture of drainage elements or bats 200, comprises a screw extruder/agglomerator 12 whose output falls onto an intermediate conveyor 14. Conveyor 14 delivers noodles 16 (being the output of agglomerator 12) to oscillating conveyor 18. Conveyor 18 is mounted on a frame 20 that permits oscillation about a vertical axis X. The noodles 16 are delivered to the chute 22 of a funnel compactor/shaper 24. The compactor/shaper 24 is disposed above the output conveyor 26.

Turning to FIG. 3, extruder/agglomerator 12 is shown in more detail. This comprises a hopper 30 into which mixed shredded plastics material waste can be added, preferably on a continuous basis from a feed conveyor (not shown). In the base of the hopper 30 is disposed an extruder archimedes screw 32 that transports the waste material along the barrel 34 of the extruder 12. The flights 36 of the screw 32 become increasingly tight so that waste material is compressed as it progresses along the barrel 34. The barrel 34 is connected to an agglomerator chamber housing 38 which mounts a fixed circular, dished, agglomeration plate 40. The plate 40 is fixed in the housing 38 and has a central, circular inlet opening 42 through which the compressed waste material passes.

A main housing 44 of the agglomerator 12 mounts an axially adjustable shaft carriage 46 that is threaded in internal threads 48 of the housing 44. A motor 50 operates to rotate a worm drive 52 (through drive linkages not shown or further described). The worm drive 52 is engaged with a ring gear 56 formed on the shaft carriage 46. Thus rotation of the worm drive 52 rotates the carriage 46 about its longitudinal axis, screwing it into, or out of, the housing 44 and thereby adjusting its axial position therein. The shaft carriage 46 rotatably mounts a drive shaft 60 through bearings 62,64. The shaft 60 extends into agglomeration chamber 38 and is terminated with a round, domed agglomeration plate 70. The plate 70 is formed in two parts 70*a*,*b* to define a water-cooling chamber 72. Water is fed from the other end of the shaft 60 through central bore 74 and evacuated through parallel bore 76. Indeed, at the distal end of shaft 60, a rotary coupling 78 permits attachment of a cooling water supply 80. Also on the distal end of the shaft 60 is mounted a drive pulley 82 to drive the shaft 60 by a motor (not shown).

The plates 40,70 are nested against one another. The front face of plate 70 is shown in FIG. 4, in which the direction of rotation A of the plate is shown. In the face 86 of the plate 70 is formed a number of radiating grooves 88 that are disposed somewhat inclined to the radius of the plate 70. The grooves 88 are disposed over the entire surfaces, only some of them being shown in one area of the plate 70. Also, on the face 86 are disposed a number of radially inclined ridges 90. By virtue of their inclination to the radius, they tend to transport material caught between the plates 40,70 radially outwards.

The face of the plate 40 corresponds substantially with the face 70 and has similar ridges 92 on its face. Depending on the axial position of the shaft carriage 46, the ridges 90,92 have a scissors-like shearing action on material between them when the shaft 60 is rotated. As the shaft 60 rotates, the continuous shearing caused by ridges 90,92 generates heat in the plastics material. A certain amount of heat is generated already by the compression of the plastics material by the screw 36. Consequently, the thermoplastics in the waste material begins to soften and, to a limited extent, melt.

The face of the plate 40 is more dished than the face 86 of the plate 70 is domed. This means that the plastics material is squeezed into a progressively tighter space as it extrudes radially outwardly. Indeed, the plates 40,70 can be arranged to meet and slide over each other at their peripheral edges 96. In this event, the only outlets for the material worked between the plates 40,70 are the grooves 88. By the time the thermoplastics materials have reached here, they have essentially all softened considerably, and at least partially melted. So they are extruded from the grooves 88 as spaghetti-like noodles that finally break and fall through an open bottom 98 of the agglomeration chamber 38.

Underneath the opening 98 is disposed the intermediate conveyor 14. By adjusting the worm screw 52, the separation between the plates 40,70 can be adjusted so that the degree of shearing of the plastics material between the two plates can be controlled.

Screw 32 is shown abutting shaft 60 but it is not driven by it. The shaft 60 rotates at a different speed to the screw 32, and so the latter is provided with its own independent drive (not shown).

Returning to FIG. 1, a first water spray 100 sprays the surface of the conveyor 14 to cool and wet it prior to the noodles 16 falling onto it. This serves two purposes: firstly to prevent the noodles from immediately sticking to the conveyor; and secondly to cool the noodles so that their surfaces rapidly harden. This prevents the noodles from coalescing and forming a solid mass. A temperature sensor 102 detects the temperature of the noodles 16 on the conveyor 14. Depending on the constituents of the waste material, this temperature will be maintained at a consistent level. Any change in temperature will indicate a need to monitor the performance of the apparatus 10 and possibly to change either the degree of cooling caused by the spray 100 or the degree of heating caused by the agglomerator 12.

The conveyor 14 delivers the noodles 16 to the oscillating conveyor 18, mounted on the frame 20. The reason for the oscillation is so that the stream of noodles 16 is delivered evenly across chute 22 of the funnel compactor 24. The noodles falling into the compactor 24 gradually fill it up and when they reach an appropriate level, output conveyor 26 is started. This conveyor serves to draw out from the bottom outlet 23 of the funnel 24 the noodles in the funnel 24. The rate of transport of the conveyor 26 is adjusted so that the level of noodles in the funnel 24 remains essentially constant. This level is arranged so that there is a constant head-load of noodles above the opening 23. This load compresses together the noodles underneath to a consistent degree. At the same time, the funnel shapes the noodles into a thin, rectangular cross-section. This cross section is not affected to any great extent by the compacted noodles turning through almost a right-angle on exiting the outlet 23 and laying on the conveyor 26. The conveyor 26 is provided with side supports 27 that serve to maintain the integrity of the side edges of the compacted noodles forming the ribbon 110. Immediately on exiting the compactor 24, several sprays 106 douse the ribbon 110 of compacted noodles to prevent any further melding together of the noodles.

In this respect, it should be born in mind that, on exiting the agglomerator 12, the plastics material has an essentially constant temperature throughout, and this is about the melting point of a substantial part of the thermoplastic contents of the waste material. The cooling spray 100 serves to cool the surface of the noodles so that they essentially comprise solid "straws" of solidified plastics around a hot and soft plastic interior. The reason for this is because most thermoplastic plastics are poor conductors of heat. Consequently a substantial temperature gradient can persist through a sample for some time. However, by the time they reach the funnel 24, the heat of the interior of the noodles will start to soften again the surface of noodles in contact with one another, or at least, those not touching cooled surfaces. In this respect, the funnel 24 is provided with a water jacket 112 that keeps the interior surface of the funnel 24 cool. Noodles in contact therewith are cooled and become more solid and slide over it with low frictional resistance. However, as the noodles are pressed against one another, internally of the funnel, they meld together as the surfaces of adjacent noodles reach melding temperature.

However, as soon as the ribbon 110 exits the outlet 23 it is necessary to immediately halt any further melting and welding together of the noodles. If it was found that the ribbon 110 had insufficient strength, then the level of material in the funnel 24 could be raised to increase the pressure between adjacent noodles. Alternatively, the amount of cooling could be reduced. Likewise, if they exit as a solid mass, the level may be reduced, so that they are not pressed together so much in the compactor/shaper.

The level in the funnel is adjusted by temporarily increasing, or decreasing the speed of takeout of the ribbon by the output conveyor 26, and this may be monitored and adjusted selectively by an operator. Equally, a sensor arrangement may be provided to detect the level in the funnel and adjust it automatically.

In addition to the sprays 106, a spray 114 cools the conveyor 26 and wets it prior to the ribbon 110 contacting it. Again, this serves to prevent any sticking of the ribbon to the conveyor belt 26.

If the thermoplastics material was particularly hot, or sticky (for example, if the material was a better than average heat conductor, or of low melt point) then it may be desirable to increase the cooling provided by the water jacket 112. With reference to FIG. 2, the water jacket 112 is provided with an inlet 116 near its base which is supplied with cold water. A plurality of outlets 118 are disposed up the opposite side of the jacket 112 and the top-most open one of them controls the level of the cooling water in the jacket 112. Equally, they could all be open, but have restrictions therein, so that it is only the rate of inflow that controls the level in the jacket. Indeed, a combination of these two measures could be employed to both control the upper level of cooling and the degree of cooling.

Finally, the bats 200 are cut to length from the ribbon 110 once the ribbon has cooled sufficiently for handling purposes.

While the bats are useful in respect of providing a drainage medium and path for excess water in soil, they also have an irrigation function. Although bats made according to the present invention may be employed to drain surfaces growing plants, such as grass, for example, they also retain water which becomes available, and is released, to the soil as it dries out. To enhance this function, it is desirable to provide inclusions in the bats of such materials as rubber chips, as from recycled vehicle tyres, or fibres, as from old carpets, or even charcoal, that has the effect of absorbing certain noxious chemicals that might be in the soil. These inclusions may conveniently be added after the agglomeration step. Indeed, further addition of unagglomerated thermoplastics material may also be added at this stage. In the compactor/shaper funnel, all the inclusions become captivated between noodles and increase the dimensions of the gaps between them. Depending on the nature of the inclusions, they may even be bonded by soft plastics of the noodles, so that they are not merely enclosed by surrounding noodles, but also bound to them.

Finally, it is also possible to include a blowing agent in the plastics material added to the agglomerator. This results in fatter, less dense noodles, preferably having an open cell structure. In that event, not only are the resulting bats less heavy, but also their water retention may be greater through penetration of the noodles themselves and retention thereby.

While a twin-plate agglomerator is shown and described herein, other forms of agglomeration and plastics densifiers are within the ambit of the present invention, provided that the outcome is noodles of softened and partially melted thermoplastics material for subsequent formation into bats.

Figure 6:
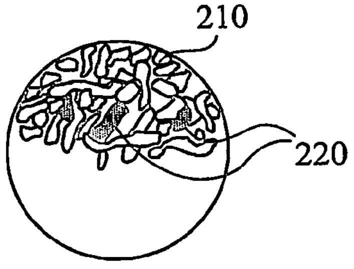
FIG. 6 is a closer view of the detail from FIG. 5.

In FIG. 5, a bat 200 of a drainage/irrigation element in accordance with the invention is shown. This is about 250 mm wide, 50 mm deep and any convenient length, for example 1000 mm. Generally, the noodles 210 that make up the bat 200 are about 5 mm in diameter, but this is irregular. Likewise, their lengths vary over a considerable range from 5 mm to 50 mm or more. In FIG. 6, inclusions 220 are visible of rubber tyre fragments captivated by and, to a certain extent, bonded to, adjacent noodles.

Of course, although the term "water" is used frequently herein, and the following claims, the term should be understood in this context to include any suitable cooling medium, whether this be in connection with the various sprays employed or the cooling jacket of the compactor/shaper.

The invention claimed is:

1. A method of making drainage elements from recycled thermoplastic plastics materials comprising the steps of:

a) providing chopped waste thermoplastic plastics to an agglomerator;

b) agglomerating the waste plastics and wherein the mechanical energy imparted by the agglomerator heats the plastics material to about the melting point of a proportion of said thermoplastic plastics material so that malleable noodles of softened plastics material extrudes from an outlet of said agglomerator;

c) conveying said noodles to a chute of a compactor/shaper funnel having an outlet disposed closely above an output conveyor belt;

d) arranging the belt to convey from the outlet of the compactor/shaper funnel a compacted ribbon of said agglomerated plastics material at a rate such that the noodles in the funnel have a head to compact said noodles in the outlet sufficient to meld the noodles together but not without leaving multiple spaces between them; and e) cooling the ribbon and chopping it into batts.

2. A method as claimed in claim 1, wherein there is no further addition of heat beyond that generated by said mechanical energy.

3. A method as claimed in claim 1, wherein said agglomerator is a twin-plate agglomerator in which a first plate is closely adjacent to, and rotates with respect to, a second plate, said first plate being provided with ridges extending substantially radially from the axis of rotation of the rotating plate, and at least one of said first and second plates being provided with grooves also extending substantially radially from the axis of rotation of the rotating plate, said waste agglomerating between said plates.

4. A method as claimed in claim 3, wherein said agglomerator includes a screw extruder having a screw, said agglomerator further having a agglomeration chamber between said first plate and said second plate, and said agglomerating step further comprising:

compressing said waste with said screw in said extruder and delivering said compressed waste to the inlet of said agglomerator chamber.

5. A method as claimed in claim 4, in which there is no further addition of heat beyond that generated by said mechanical energy, and in which the agglomeration chamber between said first plate and said second plate is adjustable, whereby the temperature of the noodles exiting said agglomerator chamber can be adjusted.

6. A method as claimed in claim 5, in which said grooves and said ridges are inclined with respect to the radius of rotation of said first plate.

7. A method as claimed in claim 1, in which said noodles have a surface and an interior, and said conveying of said noodles to the chute further comprises:

cooling said noodles during said conveyance to said chute so that said surface of said noodles is substantially petrified and non-sticky while said interior of said noodles is soft, having sufficient heat to meld together noodles in contact with one another.

8. A method as claimed in claim 7, in which said step of cooling said noodles during said conveyance to said chute comprises the step of:

conveying said noodles from said agglomerator on an intermediate conveyor belt and spraying the said intermediate conveyor belt with cooling water before said noodles drop onto said intermediate conveyor belt from said agglomerator.

9. A method as claimed in claim 1, in which said compactor funnel is provided with a cooling jacket, said compactor funnel having a base.

10. A method as claimed in claim 9, in which said cooling jacket has adjustable levels of cooling, whereby said noodles in said compactor are cooled, the degree of said cooling being adjustable.

11. A method as claimed in claim 10, in which said cooling jacket comprises a water jacket having a water inlet at said base of said funnel proximate said outlet of said funnel, and several at least two water outlets at different levels above said water inlet.

12. A method as claimed in claim 11, in which said water outlets may be selectively blocked so that the level of water in said cooling jacket, and/or its temperature, may be controlled.

13. A method as claimed in claim 11, in which the rate of flow of said water into said cooling jacket is adjustable, so that the level of water in said cooling jacket, and/or its temperature, may be controlled.

14. A method as claimed in claim 1, in which said chute has a mouth and in which the step of conveying of said noodles to said chute of said compactor/shaper comprises:

delivering said noodles to said chute evenly across said mouth of said chute so that there is a substantially level surface of said noodles in said funnel and therefore an even compression of said noodles beneath.

15. A method as claimed in claim 14, in which said delivering of said noodles to said chute evenly across said mouth of said chute is achieved by arranging for the said intermediate conveyor to oscillate oscillating across the width of the mouth of said chute.

16. A method as claimed in claim 15, in which said intermediate conveyor delivers to a separate oscillating conveyor, said separate oscillating conveyor communicating with said chute.

17. A method as claimed in claim 1, in which said step of conveying said noodles to said chute further comprises:

sprinkling chips selected from the group comprising fibre, rubber, vermiculite, solid thermoplastics and charcoal onto said noodles on said intermediate conveyor to form inclusions in the bats.

18. A method as claimed in claim 1 in which said step of providing chopped waste thermoplastic plastics to an agglomerator further comprises:

Adding a blowing agent to reduce the density of said noodles and rendering said noodles porous so that water retention of said bats is further enhanced.

* * * * *

UNITED STATES PATENT AND TRADEMARK OFFICE

CERTIFICATE OF CORRECTION

PATENT NO. : 7,638,077 B2
APPLICATION NO. : 10/548917
DATED : December 29, 2009
INVENTOR(S) : John Gaskarth It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1051 days.

Signed and Sealed this

Ninth Day of November, 2010

David J. Kappos

*Director of the United States Patent and Trademark Office*